United States Patent Office 3,551,576
Patented Dec. 29, 1970

3,551,576
ANTI-FIBRINOLYTIC AGENT
Larry J. Loeffler, North Wales, Pa., assignor to Merck & Co., Inc., Rahway, N.J., a corporation of New Jersey
No Drawing. Original application Feb. 28, 1968, Ser. No. 708,770. Divided and this application July 28, 1969, Ser. No. 870,905
Int. Cl. A61k 27/00
U.S. Cl. 424—319       1 Claim

ABSTRACT OF THE DISCLOSURE

The method of treating a pathological fibrinolytic state in mammals which involves the daily oral administration of from 1 to 20 mg./kg. of body weight of the compound:

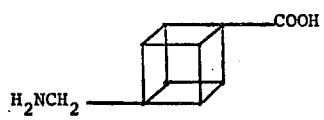

This application is a division of U.S. Ser. No. 708,770 filed Feb. 28, 1968.

This invention relates to new anti-fibrinolytic compounds and to a method of counteracting certain hemorrhagic conditions and other disorders resulting from a pathological fibrinolytic state in patients. More specifically, this invention relates to the new compound, 4-aminomethylcubane - 1 - carboxylic acid having the structure:

Chemically, the compound is also named as 4 - aminomethyl pentacyclo [4.2.0.0.$^{2.5}$0$^{3.8}$0$^{4.7}$]octane - 1 - carboxylic acid.

This compound is useful in the prevention or treatment of a pathological fibrinolytic state in mammals including persons and animals by the oral administration of from 1 to 20 and preferably 2 to 8 mg./kg. of body weight per day of the above compound for varying periods of treatment.

The dissolution of fibrin deposits in mammals is due to their lysis by the enzyme plasmin (fibrinolysin) which is formed in the blood from plasminogen, also present in the blood. This conversion from plasminogen to plasmin is promoted by activators in the blood and it would appear that excessive fibrinolytic activity results from an overabundance of such activators. When too much plasmin is present, the clotting system of the blood becomes unbalanced, viable clots cannot be maintained, and hemorrhage may result. This situation is known as a fibrinolytic state. Other enzyme systems (i.e., the kallikreins, complement) may also be activated in an undesirable manner when such a state exists.

An interest has recently developed in anti-fibrinolytic agents, i.e. drugs which will inhibit the activation of plasminogen to form plasmin. These anti-fibrinolytic agents are believed to interfere with the function of the activators of converting plasminogen to plasmin. The clinical uses of such drugs include their administration to persons undergoing various kinds of surgery (such as heart-lung and prostate surgery), obstetrical hemorrhage problems, menorrhagia, and many other uses which have been suggested in the literature (e.g. see Nilssen, Acta Medica Scand. Suppl. 448, volume 180 (1966).

A standard anti-fibrinolytic agent, against which newer ones are generally tested and compared is epsilon aminocaproic acid, known as Eaca. One deficiency of this agent has been the very high dosages needed; in some cases 3–6 grams or more every 4 to 6 hours. Also, side effects such as dizziness, nausea and diarrhea have been observed. More recently, two more potent agents have been described, namely trans-4-aminomethylcyclohexane carboxylic acid (Amcha) and 4 - aminomethylbenzoic acid (Pamba). Each is reported to be more active than Eaca by both in vitro and in vivo tests (e.g. see Anderssen et al. Scand. J. Haemat. (1965) 2,230 and Melander et al. Acta Pharmacol. et Toxicol (1965) 22,340, both of which discuss Amcha).

I have found that the above compound shows activity of about 15 times that of Eaca in in vitro tests essentially the same as those known to correlate with human clinical results. I have thus also found an improved anti-fibrinolytic method of therapeutic treatment requiring much smaller doses of the drug.

The compound of this invention is prepared by starting with the known compound dimethyl cubane - 1,4 - dicarboxylate, also named dimethyl pentacyclo[4.2.0.0.-0.$^{2.5}$0.$^{3.8}$0.$^{4.7}$]octane - 1,4 - dicarboxylate. It was prepared essentially as described by P. E. Eaton et al. (J. Am. Chem. Soc. 86,962 (1964). Infrared spectra, NMR data, melting point and elemental analysis compared favorably with reported values. The material was also found to be homogeneous by thin layer chromatography and vapor phase chromatography.

The following is the stepwise procedure for making the compound of this invention.

EXAMPLE

Preparatioin of methyl hydrogen cubane-1,4-dicarboxylate (2)

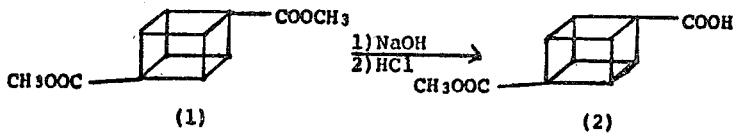

A sample of 5.84 g. (0.0265 mole) dimethyl cubane-1,4-dicarboxylate (1) was dissolved in 75 ml. boiling absolute methanol (dissolution slow). This was added to a solution of sodium methoxide prepared by dissolving 0.61 (0.0265 mole) sodium metal in 75 ml. absolute methanol. After the addition of 10 ml. distilled water, the solution was stirred magnetically and refluxed under nitrogen for 22 hours. After removal of the methanol in vacuo (40–50° C.), 25 ml. distilled water was added, dissolving all but a small quantity of solid. This material was removed by extraction with three separate 25 ml. portions of chloroform. After drying over magnesium sulfate, the combined chloroform layers yielded 0.73 g. (12.5 percent) unsaponified solid diester (1), which can be recycled. The aqueous layer, after cooling, was acidified with 5.0 ml. 6.0 N hydrochloric acid. The resultant copious white precipitate was then extracted into five separate 100 ml. portions ethyl acetate, the combined extracts washed with water and dried over magnesium sulfate. Filtration and removal of the solvent in vacuo afforded 4.02 g. white solid (74 percent calculated as mono acid). This layer chromatography indicated the product to be a mixture of the two expected acidic components, mono and diacids, the latter only a minor constituent. TLC (Sil. G.) 90:25:4 benzene: dioxane:acetic acid H$_2$SO$_4$ Char., R$f$(monoacid)

0.73; Rf(diacid)0.55. The material, once dried, appeared to be practically insoluble in chloroform, not very soluble in ethyl acetate and soluble in ethanol and methanol.

Separation was achieved by employing a Silicar 7G Analtech Unibar in an ascending fashion using 90:25:4 benzene:dioxane:acetic acid as eluant, then extracting with methanol. On one pass, 4.90 g. of crude acid mixture afforded 2.79 g. pure mono acid, the remainder tailing off into the diacid zone. Impure material could be re-chromatographed or esterified. The pure mono acid, as recovered from the column, melted at 172–176° C. Three recrystallizations from ethyl acetate gave an analytical sample M.P. 174.5–176° C. An NMR spectrum (d-DMSO)

exhibited a singlet at 3.70 p.p.m. (3 protons, $COOCH_3$) and a singlet at 4.22 p.p.m. (6 protons, cube).

Preparation of methyl-4-carboxamidocubane-1-carboxylate (3)

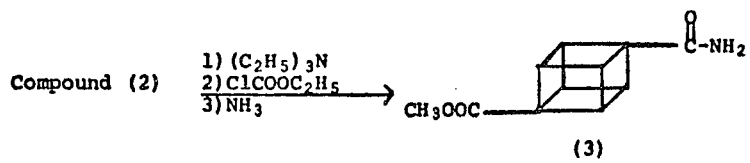

In a dry atmosphere under nitrogen was dissolved 2.22 g. (10.80 mM.) methyl hydrogen cubane-1,4-dicarboxylate (2) in 50 ml. dry tetrahydrofuran (distilled over sodium hydride). The mixture was stirred mechanically. After chilling to −10° C., 1.14 g. (11.26 mM.) triethylamine in 10 ml. tetrahydrofuran (THF) was added in one portion, then over a 5-minute period 1.21 g. (11.24 mM.) ethyl chloroformate in 10 ml. THF, keeping the temperature at −10±2° C. Triethylamine hydrochloride separated from the reaction mixture. After stirring for an additional 30 minutes at −10° C., ammonia gas was bubbled through the mixture for 10 minutes with continued cooling (temperature rose to +10° C.). The ice bath was removed and the mixture allowed to stir overnight. After addition of 40 ml. distilled water, the clear colorless solution was evaporated in vacuo at 50–60° C. to remove THF. The product crystallized during the evaporation. Chilling afforded 1.14 g. (51.7 percent) solid. Continuous extraction of the aqueous layer with ethyl acetate, followed by recrystallization of the residue from methanol yielded only an additional 105 mg. product (56.7 percent total). The material crystallized as lustrous plates from methanol, but crude material appeared to be essentially as pure as recrystallized. The product possessed no sharp melting behavior, but darkened at 228–238° C., then melted at 238–240° C. to a dark brown material.

An NMR spectrum (d-DMSO) exhibited the following absorptions: singlet, 3.63 p.p.m. (3 protons, $COOCH_3$); singlet, 4.11 p.p.m. (6 protons, cube); broad absorption at 6.8–7.3 p.p.m. (2 protons, $CONH_2$).

Preparation of methyl-4-cyanocubane-1-carboxylate (4)

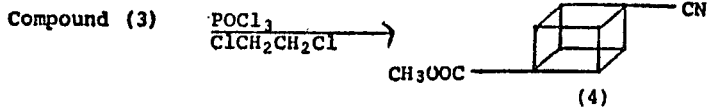

To 410 mg. (2.00 mM.) methyl-4-carboxamidocubane-1-carboxylate (3) suspended in 15 ml. freshly distilled 1,2-dichloroethane was added 1.0 ml. phopshorous oxychloride. When heated to reflux for 30 minutes the solid dissolved, then the mixture became slightly turbid. After removal of the solvent and excess phosphorous oxychloride in vacuo at 60–70° C., the residue was taken up in 25 ml. chloroform. After thorough washing with saturated sodium bicarbonate, the chloroform layer was dried over anhydrous magnesium sulfate, then stripped to a white solid, 296 mg. (79 percent crude), M.P. 138–143° C. A small sample recrystallized beautifully from absolute ethanol, M.P. 145.5–147° C. an NMR spectrum in $CDCl_3$ exhibited a singlet at 3.70 p.p.m. (3 protons) and a singlet at 4.32 p.p.m. (6 protons). An infra-red spectrum (KBr pellet) showed absorptions at 2220 cm.$^{-1}$ and 1720 cm.$^{-1}$.

Preparation of 4-cyanocubane-1-carboxylic acid (5)

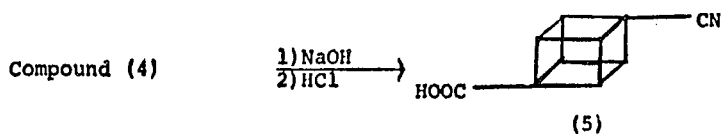

To 290 mg. (1.55 mM.) methyl-4-cyanocubane-1-carboxylate (4) dissolved in 10 ml. hot absolute ethanol was added 1.0 ml. 2.00 N sodium hydroxide. The solution was stirred and refluxed for 2 hours, then left at room temperature overnight. After removal of the ethanol in vacuo, 10 ml. water was added, the solution filtered cooled and acidified with 1.0 ml. 6N·HCl. The acid which separated was extracted into ethyl acetate; the extract dried over magnesium sulfate, filtered and stripped in vacuo affording 217 mg. crude cyano acid (81 percent), M.P. 196–202° C.

Chromatography gave a sample of sufficient purity for use in the next synthetic step. An infrared spectrum showed absorptions at 2220 cm.$^{-1}$ and 1690 cm.$^{-1}$.

Preparation of 4-aminomethylcubane-1-carboxylic acid (6)

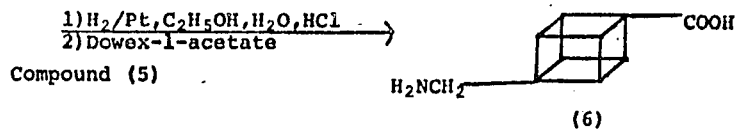

To 156 mg. (0.90 mM.) 4-cyanocubane-1-carboxylic acid (5) dissolved in 25 ml. methanol was added 10 ml. distilled water, 0.50 ml. 6.0N·HCl, and 100 mg. platinum oxide. The mixture was hydrogenated at 35 lbs./in.² on a Parr apparatus for 70 minutes. After filtration to remove the catalyst, the methanol was removed in vacuo and the resulting aqueous solution filtered through celite to remove a faint turbidity. Evaporation left the crude hydrochloride. An NMR spectrum on the crude amino acid hydrochloride in D₂O exhibited a singlet at 3.32 p.p.m. (2 protons) and a quartette (A₂B₂ pattern) centered at 4.11 p.p.m. (6 protons). Conversion of the salt to the free amino acid was accomplished by passage of an aqueous solution over Dowex-1 acetate, and the free amino acid was purified by recrystallization (needles) from a water acetone mixture.

The pure material (6) decomposed without melting at 245–255° C. when placed in a melting point bath at 180° C. The material exhibited one clear yellow spot (ninhydrin) upon thin layer chromography, Silica Gel G., 3:1:1 BuOH:HOAc:H₂O, R$f$=0.60, and infrared absorptions (KBr pellet) at 2130 cm.⁻¹, 1640 cm.⁻¹, 1625 cm.⁻¹, 1560 cm.⁻¹, 1530 cm.⁻¹, 1500 cm.⁻¹, 1460 cm.⁻¹, 1400 cm.⁻¹ (broad), 1310 cm.⁻¹, 1240 cm.⁻¹, 1200 cm.⁻¹, 1170 cm.⁻¹, 1160 cm.⁻¹, 760 cm.⁻¹.

The invention also contemplates that the carboxylic ester derivatives of (6) may be prepared by direct esterification of the amino acid such as by the use of alcoholic hydrogen chloride or thionyl chloride followed by alcohol. Similarly, the alkanoyl amino derivatives of (6) are prepared by acylation of the amino acids. These esters and alkanoyl amino derivatives are to be considered as included within the scope of the compounds represented by the above structural formula (6) and in the appended claims.

The compound of this invention is used in the method of this invention by either oral or intravenous administration, although the oral route is preferred. The esters and amides of this class of compounds are not themselves very active in vitro but the action of enzymes in vivo may cause the slow liberation of the highly active amino acids, thus providing a prolonged availability of the drug in the body. This is important because of the tendency of these drugs to be swiftly eliminated in the urine.

The compound of this invention can be used in any pharmaceutically acceptable carrier, in the form of pills, tablets or capsules. The pharmaceutically acceptable salts (both of the amino group—such as the hydrochloride, hydrobromide, sulfate, citrate, tartrate, etc., and of the carboxy group—such as the alkali metal, alkaline earth metal, etc., salts) are readily usable, especially in injectable compositions.

What is claimed is:
1. The method of treating a pathological fibrinolytic state in mammals which involves the daily oral administration of from 1 to 20 mg./kg. of body weight of the compound:

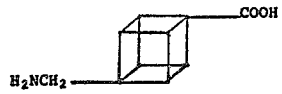

References Cited

Noller, Chemistry of Organic Compounds, 2nd ed., p. 230 (1960).

STANLEY J. FRIEDMAN, Primary Examiner

U.S. Cl. X.R.

260—514